United States Patent
Tuertscher et al.

(10) Patent No.: US 10,017,425 B2
(45) Date of Patent: Jul. 10, 2018

(54) METHODS AND MATERIALS FOR FORMING IN-SITU CAVITIES FOR SILICON-BASED CERAMIC MATRIX COMPOSITE COMPONENTS

(71) Applicant: General Electric Company, Schenectady, NY (US)

(72) Inventors: Michael Ray Tuertscher, Cincinnati, OH (US); Mark Eugene Noe, Cincinnati, OH (US); Glen Harold Kirby, Cincinnati, OH (US); Sheena Kum Foster Walker, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 14/893,702

(22) PCT Filed: Apr. 23, 2014

(86) PCT No.: PCT/US2014/035088
§ 371 (c)(1),
(2) Date: Nov. 24, 2015

(87) PCT Pub. No.: WO2014/193565
PCT Pub. Date: Dec. 4, 2014

(65) Prior Publication Data
US 2016/0115086 A1   Apr. 28, 2016

Related U.S. Application Data

(60) Provisional application No. 61/828,273, filed on May 29, 2013.

(51) Int. Cl.
*C04B 35/80* (2006.01)
*F01D 5/28* (2006.01)
(Continued)

(52) U.S. Cl.
CPC ............ *C04B 35/806* (2013.01); *C04B 35/14* (2013.01); *C04B 35/573* (2013.01); *C04B 41/53* (2013.01);
(Continued)

(58) Field of Classification Search
CPC .................................................. C04B 35/806
See application file for complete search history.

(56) References Cited

U.S. PATENT DOCUMENTS 3,907,949 A   9/1975   Carlson
4,615,855 A   10/1986  Orlowski et al.
(Continued)

FOREIGN PATENT DOCUMENTS

CN   1131590 A    9/1996
CN   101224497 A  7/2008
(Continued)

OTHER PUBLICATIONS

Unofficial English translation of Office Action issued in connection with corresponding CN Application No. 201480030986.5 dated May 6, 2016.
(Continued)

*Primary Examiner* — Larry Thrower
(74) *Attorney, Agent, or Firm* — General Electric Company; William Scott Andes (57) ABSTRACT

Methods and materials for forming in-situ features in a ceramic matrix composite component are described. The method of forming a ceramic matrix composite component with cooling features, comprises forming a preform tape, laying up said preform tape to a desired shape, placing a high-temperature resistant fugitive material insert of preselected geometry in the preform tape of the desired shape, compacting the preform tape of the desired shape, burning out the preform tape of the desired shape, melt infiltrating
(Continued)

the desired shape, removing the high-temperature resistant insert to form the cooling features during one of the burning out or the melt infiltrating or following the burning out or the melt infiltrating.

20 Claims, 4 Drawing Sheets

(51) Int. Cl.
    *C04B 35/573*     (2006.01)
    *C04B 35/14*     (2006.01)
    *C04B 41/53*     (2006.01)
    *C04B 41/85*     (2006.01)
    *F01D 5/18*     (2006.01)

(52) U.S. Cl.
    CPC .............. *C04B 41/85* (2013.01); *F01D 5/284* (2013.01); *C04B 2235/5248* (2013.01); *C04B 2235/6028* (2013.01); *C04B 2235/616* (2013.01); *F01D 5/187* (2013.01); *F05D 2230/31* (2013.01); *F05D 2230/40* (2013.01); *F05D 2300/131* (2013.01); *F05D 2300/15* (2013.01); *F05D 2300/211* (2013.01); *F05D 2300/2106* (2013.01); *F05D 2300/222* (2013.01); *F05D 2300/2282* (2013.01); *F05D 2300/6033* (2013.01); *Y02T 50/672* (2013.01)

(56) References Cited

U.S. PATENT DOCUMENTS

| | | | |
|---|---|---|---|
| 5,015,540 | A | 5/1991 | Borom et al. |
| 5,066,454 | A | 11/1991 | Hanson |
| 5,330,854 | A | 7/1994 | Singh et al. |
| 5,336,350 | A | 8/1994 | Singh |
| 5,628,938 | A | 5/1997 | Sangeeta et al. |
| 6,024,898 | A | 2/2000 | Steibel et al. |
| 6,328,834 | B1 | 12/2001 | Rebstock et al. |
| 6,403,158 | B1 | 6/2002 | Corman |
| 6,627,019 | B2 | 9/2003 | Jarmon et al. |
| 7,600,979 | B2 | 10/2009 | Steibel et al. |
| 7,837,914 | B2 | 11/2010 | Kostar et al. |
| 7,926,182 | B2 | 4/2011 | Hou |
| 2002/0180120 | A1 | 12/2002 | Corman et al. |
| 2003/0059577 | A1* | 3/2003 | Morrison ............ B32B 3/18 428/166 |
| 2003/0129375 | A1 | 7/2003 | Bauer et al. |
| 2004/0067316 | A1 | 4/2004 | Gray et al. |
| 2005/0056020 | A1 | 3/2005 | Hadder |
| 2005/0118392 | A1 | 6/2005 | Millard et al. |
| 2006/0283014 | A1 | 12/2006 | Subramanian et al. |
| 2007/0096371 | A1 | 5/2007 | McGuigan et al. |
| 2008/0199661 | A1 | 8/2008 | Keller et al. |
| 2010/0279845 | A1 | 11/2010 | Kebbede et al. |
| 2013/0017094 | A1 | 1/2013 | Coupe et al. |
| 2013/0017409 | A1 | 1/2013 | Coupe et al. |
| 2013/0171426 | A1 | 7/2013 | De Diego et al. |
| 2013/0285296 | A1 | 10/2013 | Gray et al. |
| 2014/0072736 | A1 | 3/2014 | Gray et al. |

FOREIGN PATENT DOCUMENTS

| | | |
|---|---|---|
| CN | 102527601 A | 7/2012 |
| CN | 1027410443 A | 10/2012 |
| EP | 2578553 A2 | 4/2013 |

OTHER PUBLICATIONS

European Search Report and Opinion issued in connection with related EP Application No. 13165242.2 dated Sep. 10, 2013.
European Search Report and Opinion issued in connection with related EP Application No. 13165241.4 dated Sep. 13, 2013.
U.S. Non-Final Office Action issued in connection with related U.S. Appl. No. 13/780,584 dated Dec. 39, 2014.
U.S. Final Office Action issued in connection with related U.S. Appl. No. 13/780,584 dated Jun. 19, 2015.
Unofficial English Translation of Chinese Office Action issued in connection with related CN Application No. 201310149114.8 dated Nov. 4, 2015.
Unofficial English Translation of Chinese Office Action issued in connection with related CN Application No. 201310149615.6 dated Nov. 4, 2015.
U.S. Non-Final Office Action issued in connection with related U.S. Appl. No. 13/780,306 dated Nov. 30, 2015.
U.S. Non-Final Office Action issued in connection with related U.S. Appl. No. 13/780,584 dated Feb. 2, 2016.
U.S. Final Office Action issued in connection with related U.S. Appl. No. 13/780,306 dated Jun. 16, 2016.
GE Related Case Form.
International Search Report and Written Opinion issued in connection with corresponding PCT application No. PCT/US2014/035088 dated Jul. 7, 2014.

* cited by examiner

METHODS AND MATERIALS FOR FORMING IN-SITU CAVITIES FOR SILICON-BASED CERAMIC MATRIX COMPOSITE COMPONENTS

CROSS-REFERENCE TO RELATED APPLICATIONS

This application is a national stage application under 35 U.S.C. § 371(c) of prior filed, co-pending PCT application serial number PCT/US14/35088, filed on Apr. 23, 2014 which claims priority to U.S. Patent Application Ser. No. 61/828,273, titled "METHODS AND MATERIALS FOR FORMING IN-SITU CAVITIES FOR SILICON-BASED CERAMIC MATRIX COMPOSITE COMPONENTS" filed May 29, 2013, all of which is incorporated by reference herein.

BACKGROUND

The disclosed embodiments generally pertain to ceramic matrix composite components for gas turbine engines. More particularly, the present embodiments relate to methods and materials for forming in-situ cavities in ceramic matrix composite components.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator vanes and a rotor assembly which rotates about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight. These turbine stages extract energy from the combustion gases.

The stator is formed by a plurality of nozzle segments which are abutted at circumferential ends to form a complete ring about the axis of the gas turbine engine. Each nozzle segment may comprise one or more vanes which extend between an inner band and an outer band. The stator nozzles direct the hot combustion gas in a manner to maximize extraction at the adjacent downstream turbine blades.

Turbine rotor assemblies typically include at least one row of circumferentially-spaced rotor blades. Each rotor blade includes an airfoil that having a pressure side and a suction side connected together at leading and trailing edges. Each airfoil extends radially outward from a rotor blade platform. Each rotor blade may also include a dovetail that extends radially inward from a shank extending between the platform and the dovetail. The dovetail is used to mount the rotor blade within the rotor assembly to a rotor disc or spool. Known blades are hollow such that an internal cooling cavity is defined at least partially by the airfoil, platform, shank, and dovetail.

Ceramic matrix composite ("CMC") materials are of particular interest for use in gas turbine engines as higher operating temperatures are sought to increase efficiencies. CMC materials may be used for various components, for example airfoils in the turbine, compressor and fan regions of the engine. CMC materials typically comprise a ceramic fiber reinforcement material embedded in a ceramic matrix material. The reinforcement material aids to provide load-bearing function for the CMC and the ceramic matrix protects the reinforcement material, maintains fiber orientation and dissipates loads to the reinforcement material. Various methods are taught in U.S. Publication No. 2013/0285296 dated 31 Oct. 2013 and U.S. Publication 2014/0072736 dated 13 Mar. 2014, both of which are incorporated by reference herein.

With currently utilized ceramic matrix composite components, features are formed in the parts after molding by subsequent machining. The machining results in removal of material to form the desired feature, for example, cooling apertures. The machined features are limited in design due to the manufacturing process of the machining to remove the material. For example, in a drilling process, the feature is generally limited to straight-line features.

It would be desirable to overcome these and other features and form a molded component with improved geometric features that currently may not be formed utilizing known machining techniques. It is further desirable to decrease or eliminate material removal or clearing steps currently required in prior art molding techniques.

SUMMARY OF THE INVENTION

According to present embodiments, a method of forming a molded ceramic matrix composite component is provided wherein an insert is provided in a preform layup of desired shape during the manufacturing process. The insert is formed of a material which can withstand temperatures associated with pyrolysis and melt infiltration steps of the manufacturing process. The insert may be formed of more complex shapes than otherwise available through known post molding processes to provide a molded feature which is otherwise not easily formable with current state of the art processes.

A method of forming a ceramic matrix composite component with cooling features, comprises forming a preform tape, laying up the preform tape to a desired shape, placing a high-temperature resistant fugitive material insert of pre-selected geometry in the preform tape of the desired shape, compacting the preform tape of the desired shape, burning out the preform tape of the desired shape, melt infiltrating the desired shape, removing the high-temperature resistant insert to form the cooling features during one of the burning out or the melt infiltrating or following the burning out or the melt infiltrating. The method wherein the removing is one of mechanical or chemical removal. The method further comprises mechanically clearing the cooling features formed by the insert. The method further comprising forming the high-temperature fugitive material resistant insert of one of boron nitride, silica, silicon oxide, boron nitride coated DAP polymer, $Y_2Si_2O_7$ rare earth oxides, boron nitride coated silicon oxide, carbon coated boron nitride, molybdenum wire, high refractories and diamond powder. The method wherein the placing is by tape-cast placement, pre-formed tube placement, spraying, screen printing, rapid prototype polymer coated with boron nitride placement, and injection molding. The method wherein the removing is a chemical dissolution. The method wherein the removing occurring during the burning out or the melt infiltrating when the insert is formed of silicon oxide. The method wherein the melt infiltrating comprises inserting molten silicon at least 2600 degrees on the burned-out preform tape of preselected shape. The method further comprising forming complex non-line of sight cooling features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The above-mentioned and other features and advantages of these embodiments, and the manner of attaining them, will become more apparent and the methods and material for forming in-situ cavities will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-5, various embodiments of the methods and materials for forming in-situ cavities are depicted. The methods and materials are utilized to manufacture cavity features in a ceramic matrix composite (CMC) component, for example to create cooling channels, slots, holes, and or achieve weight reduction and/or other purposes or functions. The method involves a fugitive material which is inserted into a preform and is removed either during or after a melt infiltration process. The process allows creation of ceramic matrix composite components with more complex features, such as in-situ cavities, molded into the components which are not otherwise formable by known post-molding machining techniques. For example, the features may include complex, non-line of sight cooling features within a CMC component. Further, features may be more readily located near surfaces where heat reduction is desired for improved cooling for example. These examples however are not limiting and other embodiments may be utilized.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of embodiments of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
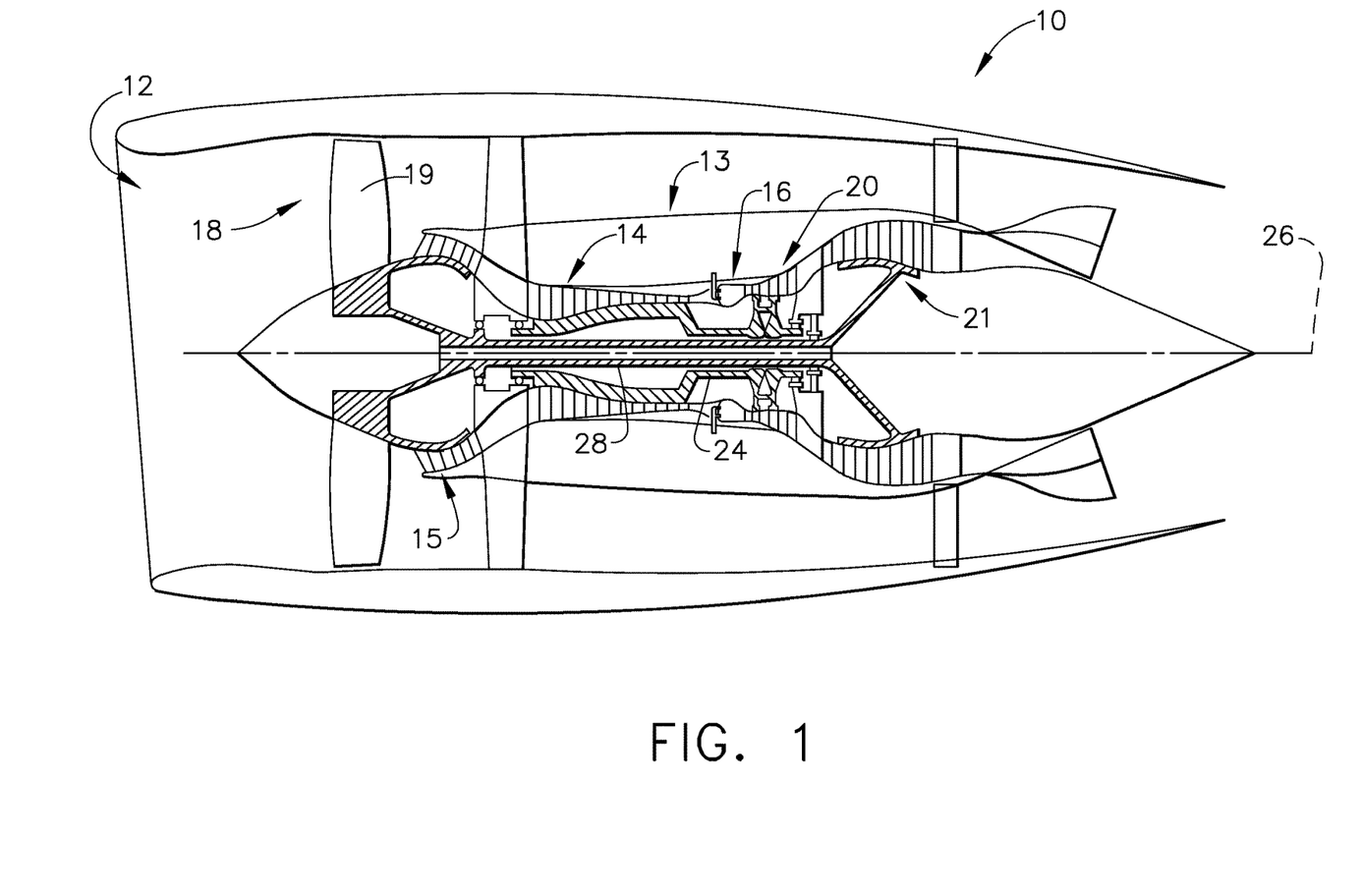
FIG. 1 is a side section view of an exemplary gas turbine engine.

Referring initially to FIG. 1, a schematic side section view of a gas turbine engine 10 is shown having an engine inlet end 12 wherein air enters a propulsor 13, which is defined generally by a multi-stage compressor, including for example a low pressure compressor 15 and a high pressure compressor 14, a combustor 16 and a multi-stage turbine, including for example a high pressure turbine 20 and a low pressure turbine 21. Collectively, the propulsor 13 provides power during operation. The gas turbine 10 may be used for aviation, power generation, industrial, marine service or the like. The gas turbine 10 is axis-symmetrical about engine axis 26 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of one or more high pressure compressor stages 14.

The engine 10 includes two shafts 24, 28. The axis-symmetrical shaft 24 extends through the turbine engine 10, from the forward end to an aft end. The shaft 24 is supported by bearings along its length. The shaft 24 may be hollow to allow rotation of the second shaft 28, a low pressure turbine shaft therein. The shaft 28 extends between the low pressure turbine 21 and a low pressure compressor 15. Both shafts 24, 28 may rotate about the centerline axis 26 of the engine. During operation the shafts 24, 28 rotate along with other structures connected to the shafts such as the rotor assemblies of the turbine 20, 21, compressor 14, 15 and fan 18 in order to create power or thrust depending on the area of use, for example power, industrial or aviation.

Referring still to FIG. 1, the inlet 12 includes a turbofan 18 which includes a circumferential array of exemplary blades 19 extending radially outward from the root. The turbofan 18 is operably connected by the shaft 28 to the low pressure turbine 21 and creates thrust for the turbine engine 10.

Within the turbine areas 20, 21 are airfoils which are exposed to extremely high temperature operating conditions. It is desirable to increase temperatures in these areas of the gas turbine engine as it is believed such increase results in higher operating efficiency. However, this desire to operate at high temperatures is bounded by material limitations in this area of the engine. Ceramic matrix composite ("CMC") components have become a desired material for use due to their ability to better withstand higher temperature operating conditions than known metal alloys.

Figure 2:
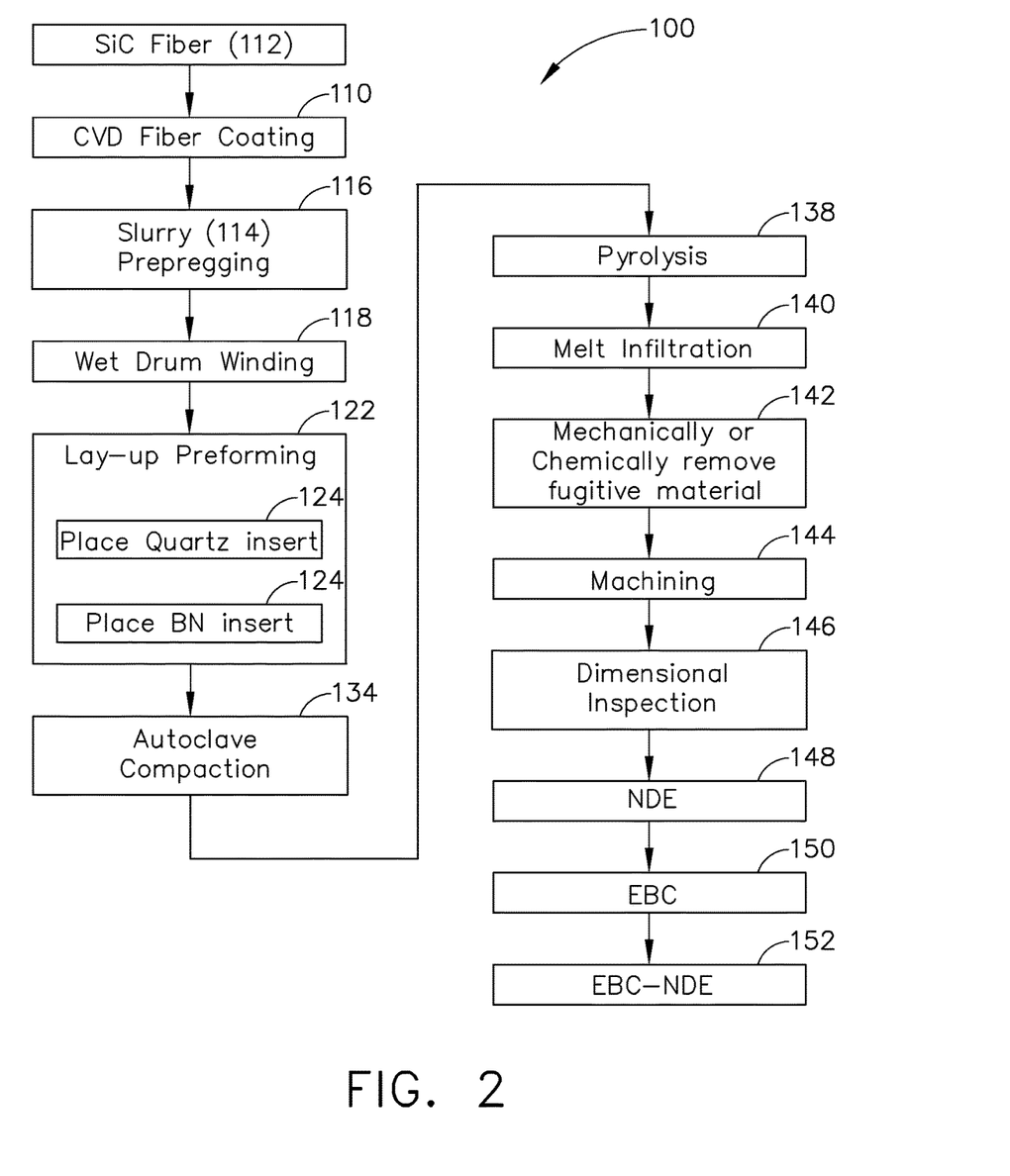
FIG. 2 is a schematic view of a method of forming in-situ cavities.
Figure 4:
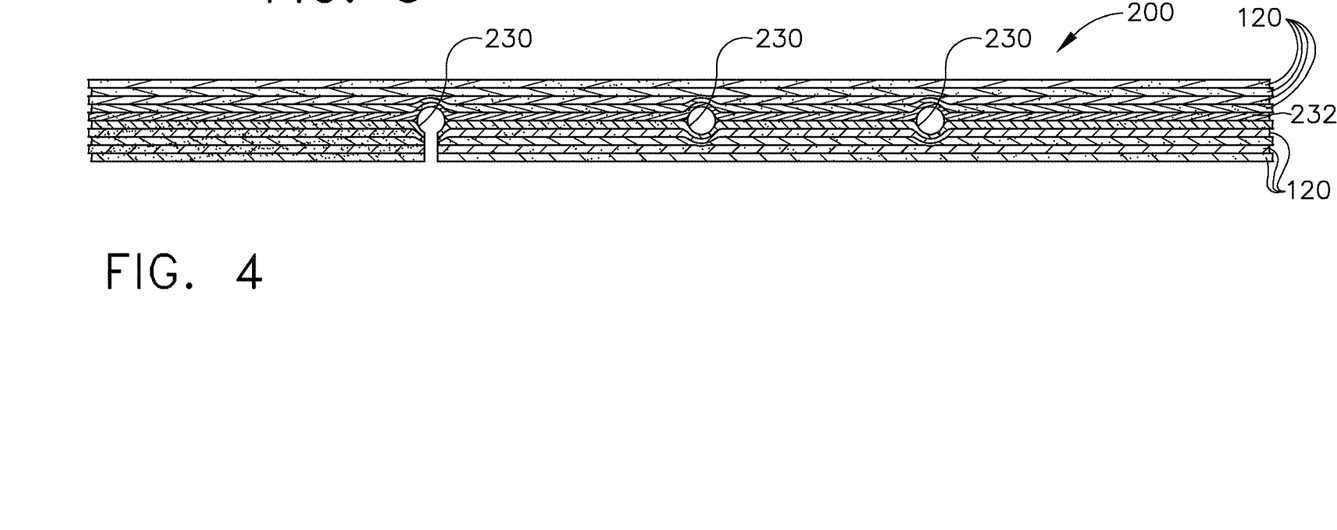
FIG. 4 is a side section view of a portion of a preform layup including cavities formed by the coupon of FIG. 3; and, FIG. 5 is a partial section view of a CMC component formed by the process with a molded feature therein.

Referring now to FIG. 2, a schematic flow chart is depicted of a method 100 for forming cooling features in a CMC component 200 (FIG. 4). First, a fiber 112 is coated with a chemical vapor deposition ("CVD") fiber coating at step 110. According to some embodiments, the fiber 112 may be formed of silicon carbide.

Next, the coated fiber 112 is moved through a prepreg slurry 114 at step 116. The prepreg slurry 114 provides an additional protective coating for the fiber. Such prepreg 114 is desirable in the bonding of the fibers as well as protection of the fiber during the manufacturing process.

After the prepregging slurry step 116, the fiber 112 is wet wound at step 118, for example, on a drum. The winding process allows for formation of pre-preg tapes 120 (FIG. 4) which are subsequently cut to desired shapes and laid-up at step 122. During the lay-up preforming at step 122, a desired component 200 shape may be formed. For example, as shown in FIG. 4, the component 200 is depicted as an airfoil and more specifically may include but is not limited to, a turbine blade, a compressor blade, a turbine vane, a compressor vane, a fan blade or any of various features which may be exposed to high temperatures and may require various types of molded in features, including but not limited to cooling features. The lay-up performing step 122 comprises layering of multiple pre-preg tape structures 120 to form a desired shape of the component 200. The layers 120 (FIG. 4) are stacked to form the "lay-up" which is a precursor to the formed ceramic component 200.

Additionally during such lay-up performing step 122, a fugitive material or insert 30 and coupon 32 (FIG. 3) is positioned within the lay-up 200 (FIG. 4) of preselected shape at step 124. The insert 30 may be in the form of the desired feature only, for example a cooling hole, or may alternatively be in the form of a coupon 32 as depicted having one or more fugitive material inserts 30 disposed thereon. The coupon 32 and inserts 30 (FIG. 3) are shown as layer 232 in the prepreg layers 120 of lay up 200 (FIG. 4). It should be understood that while one row of inserts 230 is shown in FIG. 4, this is merely one area of cross section and additional coupons 32 may be utilized. It should also be understood that the inserts 30 of FIG. 3 become the cavities or features 230 in FIG. 4. It is desirable that various CMC components have inner cavities 230 (FIG. 4) for various functions including, but not limited to, cooling slots, holes or weight saving features. According to some embodiments for example, a coupon 32 (FIG. 3) may be formed of SiC fibers in a silica carbide matrix and the insert or fugitive material 30 may formed of the same material or different material. The inserts 30 are capable of formation in various manners, such as tape cast, preformed silicon oxide tubes, spray, screen print, rapid prototype polymer coating with boron nitride or injection molding. For example, the fugitive material insert 30 may be formed of a tape of fugitive material particulate bound by polymer in a flexible tape. The particulate may be a refractory material which is bound by polymer binders that define the flexible tape. The flexible tape may be formed by a tape casting process where a ceramic slurry is pulled under a doctor blade according to procedures known to one skilled in the art. The ceramic slurry is comprised of fugitive particulate material, polymer binders, solvents, dispersants, plasticizers and any other processing aid well known in the art for tape casting. It may be desirable that the fugitive material 30 be a low melting metal or alloy which may melt during a burnout pyrolysis operation 138 (FIG. 2) or melt infiltration step 140 of the CMC lay-up preform 200, to leave a hollow cavity or feature 230 in the preform 200. According to alternative embodiments, the fugitive material 30 may be formed of a high temperature material, which will not melt during the burnout pyrolysis operation. For example, such fugitive materials 30 include, but are not limited to, boron nitride (BN), silicon oxide (including crystalline and amorphous forms; silicon dioxide and silicon monoxide), silicon oxide coated with boron nitride, rare earth elements (where the rare earth is selected from scandium, yttrium, lanthanum, cerium, praseodymium, neodymium, promethium, samarium, europium, gadolinium, terbium, holmium, erbium, thulium, ytterbium, and lutetium), rare earth elements coated with boron nitride, rare earth oxides, rare earth oxides coated with boron nitride, rare earth silicate (monosilicates and disilicates), rare earth silicate coated with boron nitride, elemental molybdenum, elemental molybdenum coated with boron nitride, molybdenum silicides (all forms such as MoSi2, Mo5Si3, Mo3Si, etc.), molybdenum silicides coated with boron nitride, gallium oxide, gallium nitride, indium oxide, indium nitride, tin oxide, tin nitride, indium tin oxide (ITO), alkaline earth silicates where the alkaline earth is magnesium, calcium, strontium, barium, and combinations thereof, alkaline earth aluminates, diamond powder, diamond powder coated with boron nitride, or boron nitride coated with carbon and mixtures and combinations thereof. All of these high temperature materials may be placed into the CMC during layup as a flexible tape filled with powders of the high temperature materials. Alternately, all of these high temperature materials may also be placed into the CMC during layup as a dense, flexible wire or an inflexible rod or tube. Such high temperature materials, after the CMC component is melt infiltrated, may require a subsequent air heat treatment to oxidize the high temperature material, vacuum heat treatment, inert gas heat treatment, acid treatment, base treatment, combinations thereof, or alternating combinations thereof, in order to remove the fugitive material—which may occur by melting, dissolution, sublimation, evaporation, etc.

Additionally, the shape of the fugitive material 30 may vary. One benefit of the instant process is that the molding process allows for more complex shapes 230, as shown in FIG. 4. For example, rather than drilling a cavity, such as a cooling feature, which must be linear in nature, the insert 30 (FIG. 3) may be curved and formed of differing cross-sections or shapes. Additionally, or in combination, the various shapes may change direction, as shown with the cooling aperture 230 disposed between the pressure and suction sides 212, 210 (FIG. 5) and extending to the trailing edge 214. In the embodiment, the complex shape represents a cooling aperture 230 which changes in direction and is disposed closely to the pressure (concave) side of the airfoil depicted. Additionally other geometric variations may be formed in the component 200 by varying the one or more of the shape(s) or dimension(s) of the fugitive material insert 30. Additionally, the placement of the fugitive material insert 30 allows for precise locating of the insert 30, which results in precise locating of the cavity 230 (FIG. 5) in the component 200 and further which may be closer or further from desired surfaces for temperature control.

Next, referring again to FIG. 2, the lay-up form of the component 200 goes through a compaction or debulking process at step 134, for example, an autoclave compaction process. In the compaction or debulking step 134, the preformed lay-up 200 of preselected shape is exposed to elevated temperature and pressure for purpose of beginning curing.

The melt-filtration process entails heating the laminate preform in a vacuum or an inert atmosphere to decompose the binders and produce a porous preform 200 then infiltrating the component with molten silicon. First, the component 200 first goes through a burnout step 138 wherein the lay-up 200 is placed in a furnace to convert the matrix to carbon. This process is generally referred to as pyrolysis and may also be performed at both elevated temperature and pressure.

Following this burnout at step 138, the carbon component 200 goes through a melt infiltration step 140. The preform 200 is melt infiltrated with molten silicon supplied to the preform 200. In the melt infiltration step 140, molten silicon may be utilized as an infiltrant for CMC articles formed of silicon compounds, for example, SiC. The molten silicon, for example, infiltrates into the porous burned-out preform 200 (FIG. 4) and in an embodiment, reacts with constituents within the matrix of the burned out lay-up component 200 to form a silicon-based ceramic (for example silicon carbide) that fills the porosity to yield the desired CMC component 200.

Again after the CMC component is melt infiltrated, the component 200 may require a subsequent air heat treatment to oxidize the high temperature material, vacuum heat treatment, inert gas heat treatment, acid treatment, base treatment, combinations thereof, or alternating combinations thereof, in order to remove the fugitive material—which may occur by melting, dissolution, sublimation, evaporation, etc.

In such cases, an internal cavity may be formed within a CMC preform 200 and ingress of the molten silicon infiltrant into the internal cavity during melt infiltration may be prevented or at least inhibited by use of specific inserts 30 (FIG. 3) formed of fugitive materials. The inserts 30 may include, for example, a coupon 32 of a preselected size having the desired cooling feature shapes formed of various of the fugitive materials 30. As previously indicated, the fugitive material 30 may burn off or be reduced during the pyrolysis or melt infiltration. Alternatively, other materials may not burn off during either or both of the burnout or the melt infiltration steps 138, 140.

Various materials are suitable for use as the insert 30. Materials which may be removed from the preform component 200 include non-wetting of the CMC preform, low or no reactivity with the constituents of the CMC preform 200, and/or completely fusible and drainable at a temperature of a thermal treatment performed on the CMC preform. In some embodiments, the fugitive material inserts 30 include, but are not limited to, boron nitride (BN), silicon oxide, silicon oxide coated with boron nitride (BN), silica tape, diamond powder, or boron nitride coated with carbon. Such materials may be cast into the desired shape of the inner cavity 230 (FIG. 5) and incorporated into the CMC preform. According to some embodiments, the inserts 30 were formed of fused silicon oxide ($SiO_2$). The tubes have, for non-limiting example, an inner diameter of 20 mil. and an outer diameter of 40 mil. Following the melt infiltration process, the fused silicon oxide was reduced to SiO. The insert 30 (FIG. 3) does not wet or react with the constituents of the preform 200 (FIG. 4). Additionally, the insert 30 may melt and be allowed to drain from the preform 200 during the burnout at step 138 leaving the CMC preform 200 with the hollow cavities.

Figure 3:
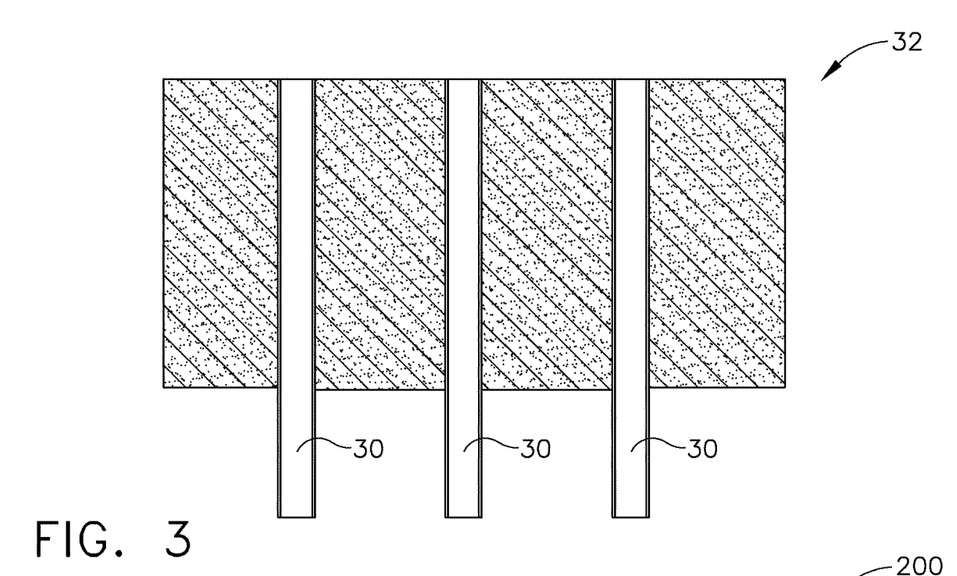
FIG. 3 is a top view of an exemplary coupon including a plurality of inserts for forming the cavities.

Additionally, or alternatively, after the burnout 138 and melt infiltration process 140, the preform 200 may be manipulated mechanically or chemically to remove the fugitive material 30 inserted into the preformed shape at step 142 (FIG. 2). In some cases, the heat treatment may be used to oxidize the insert 30 to an oxide that may be melted or dissolved in an acid or base. In other embodiments, the insert 30 may be directly dissolved in acid or base. In further embodiments, the insert 30 may be sublimed or evaporated in a vacuum heat treatment. In still other embodiments, the insert may be oxidized and subsequently sublimed or evaporated in a vacuum heat treatment. Mechanical methods may be used to mechanically remove the insert and may or may not be used with any of the previously described methods. Various methods may be utilized including chemical dissolution of the fugitive material insert 30. Additionally, it is noted that certain material such as silicon oxide may not require a removal, as such may be reduced during the burnout process 138 or melt infiltration process 140. After the mechanical or chemical of the fugitive material at step 142, the preformed of preselected shape is machined at step 144. This may include clearing the formed features 230 (FIG. 5) with wire to, for example, ensure proper flow through the slots. Subsequently, the part may be dimensionally inspected 146 by non-destructive examination at step 148 and further have environmental coating applied at step 150. A further step of non-destructive examination may be performed at step 152 after the environmental barrier coating is applied.

Figure 5:
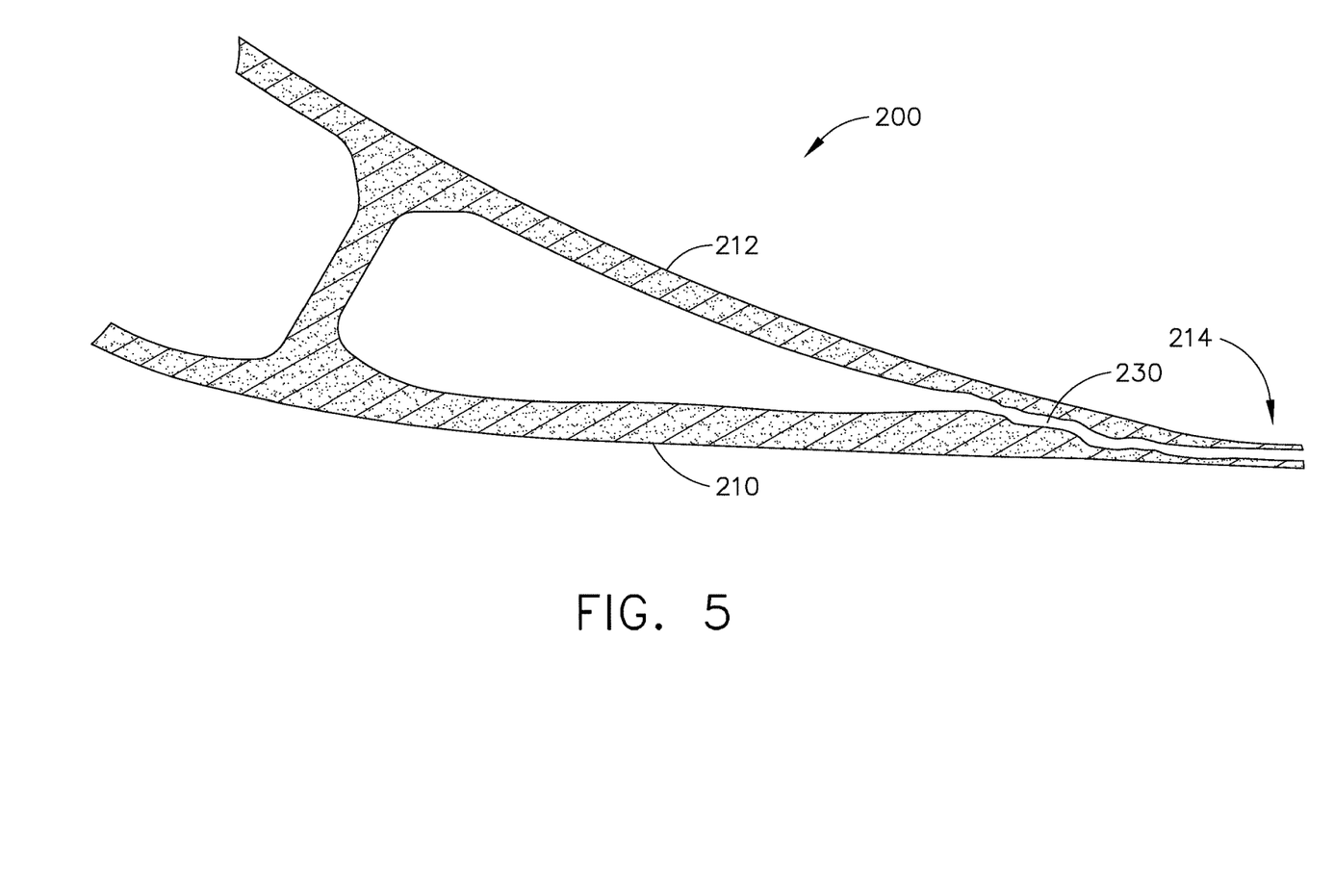

Referring now to FIG. 5, a partial side section view of a CMC component 200, such as an airfoil, is depicted. The exemplary airfoil 200 is formed of a composite including matrix and reinforcement. The CMC component 200 comprises a pressure side 212 and a suction side 210. These sides 210, 212 extend between a leading edge (not shown) and a trailing edge 214 in the chordwise direction, a direction defined along a straight axial line between the leading edge and trailing edge 214. The curvature of the pressure and suction sides 212, 210 may be dependent on the desired turning of the air flow from the fan 18. The suction side 210 of the component 200 may be convex while the pressure side 212 may be concave.

The exemplary molded in feature 230 includes various turns. Such non-line-of-sight features are not possible with drilled features. Also, by controlling the shape and placement of the insert 30, the subsequent cavity 230 may be placed closer or further from a surface of the airfoil 200. Such molded in features allows optimization of cooling for example. The optimization may come through the shape and locating of the molded in feature 230, by way of the fugitive material insert 30.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

What is claimed is:

1. A method of forming a ceramic matrix composite component with cooling features, comprising:
   forming a preform tape;
   laying up said preform tape to a desired shape;
   placing a high-temperature resistant fugitive material in the form of an insert of preselected geometry in said preform tape to form a lay-up of the ceramic matrix composite component;
   compacting said lay-up to form a preform;
   pyrolyzing said preform by burning out said preform to form a porous preform;
   melt infiltrating said porous preform with molten silicon to form said ceramic matrix composite component;
   wherein the method comprises forming said cooling features, by one or both of reducing said high temperature resistant fugitive material or removing said insert, during or following one of said pyrolyzing or said melt infiltrating.

2. The method of claim 1, wherein the high-temperature fugitive material resistant material comprises boron nitride, silica, silicon oxide, boron nitride coated DAP polymer, rare earth oxides, rare earth oxides coated with boron nitride, rare earth silicate, rare earth silicate coated with boron nitride, boron nitride coated silicon oxide, carbon coated boron nitride, molybdenum wire, high refractories, diamond powder, or combinations thereof.

3. The method of claim 2, said placing being by tape-cast placement, pre-formed tube placement, spraying, screen printing, rapid prototype polymer coated with boron nitride placement, or injection molding.

4. The method of claim 1, said removing being one of mechanical or chemical removal.

5. The method of claim 1, said removing being a chemical dissolution.

6. The method of claim 1, said removing occurring during said burning out or said melt infiltrating when said insert is formed of silicon oxide.

7. The method of claim 1, further comprising mechanically clearing said cooling features formed by said insert.

8. The method of claim 1, said melt infiltrating comprising inserting said molten silicon at least 2600 degrees into said porous preform.

9. The method of claim 1, forming complex non-line of sight cooling features.

10. The method of claim 1, wherein said cooling features are formed after said melt infiltration by removing said insert using heat treatment, acid treatment, base treatment, or combinations thereof.

11. The method of claim 1, wherein forming said preform tape comprises coating a silicon carbide fiber with a prepreg slurry.

12. The method of claim 1, wherein said insert is in the form of a tape comprising a high temperature resistant fugitive material particulate bound by a polymer.

13. The method of claim 1, wherein said insert comprises fused silicon oxide as a high temperature resistant fugitive material, and said insert is in the form of a wire, a rod, or a tube.

14. The method of claim 12, wherein said cooling features are formed by reducing and melting said fused silicon oxide during said pyrolyzing.

15. The method of claim 1, wherein said insert is in the form of a coupon comprising a plurality of inserts, said coupon comprising silicon carbide fibers in a silicon carbide matrix.

16. A method of forming a ceramic matrix composite component with cooling features, comprising:
   forming a preform tape using a silicon carbide fiber;
   laying up said preform tape to a desired shape;
   placing a high-temperature resistant fugitive material comprising silicon oxide in the form of an insert of preselected geometry in said preform tape, to form a lay-up of the ceramic matrix composite component;
   compacting said lay-up to form a preform;
   pyrolyzing said preform by burning out said preform to form a porous preform;
   melt infiltrating said porous preform with molten silicon to form said ceramic matrix composite component;
   wherein said method comprises forming said cooling features, by reducing said silicon oxide, during or following one of said pyrolyzing or said melt infiltrating.

17. The method of claim 16, wherein forming said preform tape comprises coating a silicon carbide fiber with a prepreg slurry.

18. The method of claim 16, wherein said high-temperature resistant fugitive material comprises fused silicon oxide and said insert is in the form of a tube.

19. The method of claim 18, wherein said cooling features are formed by reducing and melting said silicon oxide during said pyrolyzing.

20. The method of claim 16, wherein said insert is in the form of a coupon comprising a plurality of inserts, said coupon comprising silicon carbide fibers in a silicon carbide matrix.

* * * * *